US012567629B2

(12) United States Patent
Yoshida

(10) Patent No.: US 12,567,629 B2
(45) Date of Patent: Mar. 3, 2026

(54) SEALED BATTERY

(71) Applicant: SANYO Electric Co., Ltd., Kadoma (JP)

(72) Inventor: Masayoshi Yoshida, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 716 days.

(21) Appl. No.: 17/791,333

(22) PCT Filed: Jan. 6, 2021

(86) PCT No.: PCT/JP2021/000178
§ 371 (c)(1),
(2) Date: Jul. 7, 2022

(87) PCT Pub. No.: WO2021/145247
PCT Pub. Date: Jul. 22, 2021

(65) Prior Publication Data
US 2023/0064158 A1 Mar. 2, 2023

(30) Foreign Application Priority Data

Jan. 17, 2020 (JP) ................................. 2020-005611

(51) Int. Cl.
| | |
|---|---|
| *H01M 50/171* | (2021.01) |
| *H01M 50/188* | (2021.01) |
| *H01M 50/325* | (2021.01) |
| *H01M 50/533* | (2021.01) |

(52) U.S. Cl.
CPC ....... *H01M 50/171* (2021.01); *H01M 50/188* (2021.01); *H01M 50/325* (2021.01); *H01M 50/533* (2021.01)

(58) Field of Classification Search
CPC .. H01M 50/10; H01M 50/147; H01M 50/342; H01M 50/531; H01M 50/543;

(Continued)

(56) References Cited

U.S. PATENT DOCUMENTS

| | | |
|---|---|---|
| 2007/0009785 A1 | 1/2007 | Kozuki et al. |
| 2011/0008654 A1* | 1/2011 | Kim .................. H01M 50/3425 |
| | | 429/56 |

(Continued)

FOREIGN PATENT DOCUMENTS

| | | |
|---|---|---|
| CN | 208835104 U | 5/2019 |
| JP | 8-115715 A | 5/1996 |

(Continued)

OTHER PUBLICATIONS

Office Action dated Dec. 16, 2023, issued in counterpart CN application No. 202180008410.9, with English translation. (15 pages).

(Continued)

*Primary Examiner* — Keith Walker
*Assistant Examiner* — Steven S Ha
(74) *Attorney, Agent, or Firm* — WHDA, LLP

(57) ABSTRACT

A sealed battery as an example of an embodiment is provided with an electrode body to which an electrode tab is connected, a closed-end cylindrical exterior housing can which houses the electrode body, and a sealing body that seals an opening of the exterior housing can. The sealing body includes a rupture disk. The rupture disk has a curved first thin-walled portion and a first valve portion surrounded by a straight-line portion connecting both ends of the first thin-walled portion. The first valve portion has a protruding section protruding toward the electrode body, the electrode tab is joined to a side surface of the protruding section, and at least a part of a joint surface between the electrode tab and the protruding section is disposed on a plane crossing the straight-line portion.

9 Claims, 7 Drawing Sheets

(58) Field of Classification Search
CPC ............. H01M 50/107; H01M 50/152; H01M
50/188; H01M 50/167; H01M 50/184;
H01M 50/325; H01M 50/559; H01M
50/545; H01M 50/102; H01M 50/30;
H01M 50/3425; H01M 50/572; H01M
50/574; H01M 50/578
See application file for complete search history.

(56) References Cited

U.S. PATENT DOCUMENTS

| | | | |
|---|---|---|---|
| 2017/0133645 A1 | 5/2017 | Miyata et al. |
| 2018/0026238 A1 | 1/2018 | Andou et al. |
| 2018/0047949 A1 | 2/2018 | Sugimoto et al. |
| 2021/0057684 A1 | 2/2021 | Okutani et al. |

FOREIGN PATENT DOCUMENTS

| | | | |
|---|---|---|---|
| JP | 10-270003 A | 10/1998 |
| JP | 2008-269904 A | 11/2008 |
| JP | 2009-129553 A | 6/2009 |
| JP | 2014-102935 A | 6/2014 |
| WO | 2019/194253 A1 | 10/2019 |

OTHER PUBLICATIONS

Extended (Supplementary) European Search Report dated Apr. 15, 2024, issued in counterpart EP Application No. 21741773.2. (10 pages).
International Search Report dated Mar. 30, 2021, issued in counterpart International Application No. PCT/JP2021/000178 (2 pages).

* cited by examiner

SEALED BATTERY

CROSS-REFERENCE TO RELATED APPLICATION

This application is a National Phase Application filed under 35 U.S.C. § 371 of International Application No. PCT/JP2021/000178 filed on Jan. 6, 2021 which claims the benefit of priority under 35 U.S.C. § 119(a) of Japanese Patent Application No. 2020-005611 filed in Japan on Jan. 17, 2020, the contents of which are incorporated herein by reference.

TECHNICAL FIELD

The present disclosure relates to sealed batteries.

BACKGROUND

Conventionally, a sealed battery comprising a battery housing including a bottomed tubular exterior housing can and a sealing assembly that closes the opening of the exterior housing can is widely known. For example, Patent Literature 1 discloses a cylindrical sealed battery comprising a sealing assembly composed of a metal plate having a downwardly convex shape that is convex to the inside of the battery housing. Patent Literature 1 describes that when an abnormality occurs in the battery, the sealing assembly becomes inverted in shape, and a welded portion between the sealing assembly and a current collector part ruptures, so that current is cut off and safety is ensured.

CITATION LIST

Patent Literature

PATENT LITERATURE 1: Japanese Unexamined Patent Application Publication No. 2008-269904

SUMMARY

Technical Problem

In recent years, with the development of sealed batteries having high energy density, more importance is being placed on ensuring safety in the event of an abnormality, and there is a need for a battery design that can reliably cut off the current path in the battery in the event of an abnormality. However, on the other hand, there is a great demand for less costly batteries, and it is essential to reduce costs by simplifying the structure, reducing the number of parts, and the like.

Solution to Problem

A sealed battery according to one aspect of the present disclosure is a sealed battery including an electrode assembly having an electrode tab connected thereto, a bottomed tubular exterior housing can that houses the electrode assembly, and a sealing assembly that closes an opening of the exterior housing can. The sealing assembly includes a rupture plate. The rupture plate has a first valve part surrounded by a first thin portion having a shape of a curved line and a straight-line portion connecting between both ends of the first thin portion. The first valve part has a projecting portion projecting toward the electrode assembly. The electrode tab is joined to a side face of the projecting portion, and at least a part of a joint area between the electrode tab and the projecting portion is located in a plane intersecting the straight-line portion.

A sealed battery according to another aspect of the present disclosure is a sealed battery including an electrode assembly having an electrode tab connected thereto, a bottomed tubular exterior housing can that houses the electrode assembly, and a sealing assembly that closes an opening of the exterior housing can. The sealing assembly includes a rupture plate and a connecting member interposed between the rupture plate and the electrode tab. The rupture plate has a first valve part surrounded by a first thin portion having a shape of a curved line and a straight-line portion connecting between both ends of the first thin portion. The first valve part has a projecting portion projecting toward the electrode assembly. The connecting member is joined to a side face of the projecting portion, and the electrode tab is joined to a side face of the connecting member. At least a part of at least one of a first joint area between the projecting portion and the connecting member or a second joint area between the electrode tab and the connecting member is located in a plane intersecting the straight-line portion.

Advantageous Effects of Invention

According to the present disclosure, it is possible to provide a sealed battery in which, while the structure is simplified and low-cost, the current path is more reliably cut off when an abnormality occurs in the battery.

DESCRIPTION OF EMBODIMENTS

An example embodiment of the present disclosure will now be described in detail. While a cylindrical battery 10 in which a spiral-type electrode assembly 11 is housed in a bottomed cylindrical exterior housing can 12 is described below as an example embodiment of a sealed battery according to the present disclosure, the battery may alternatively be a rectangular battery comprising an exterior housing can having a shape of a bottomed rectangular tube. Further, the electrode assembly may be of a laminated type formed by alternately laminating a plurality of positive electrodes and a plurality of negative electrodes via a separator. In the present specification, for convenience of explanation, a sealing assembly 13 side of a battery housing including the exterior housing can 12 and the sealing assembly 13 will be referred to as "upper", and the bottom face side of the exterior housing can 12 will be referred to as "lower".

Figure 1:
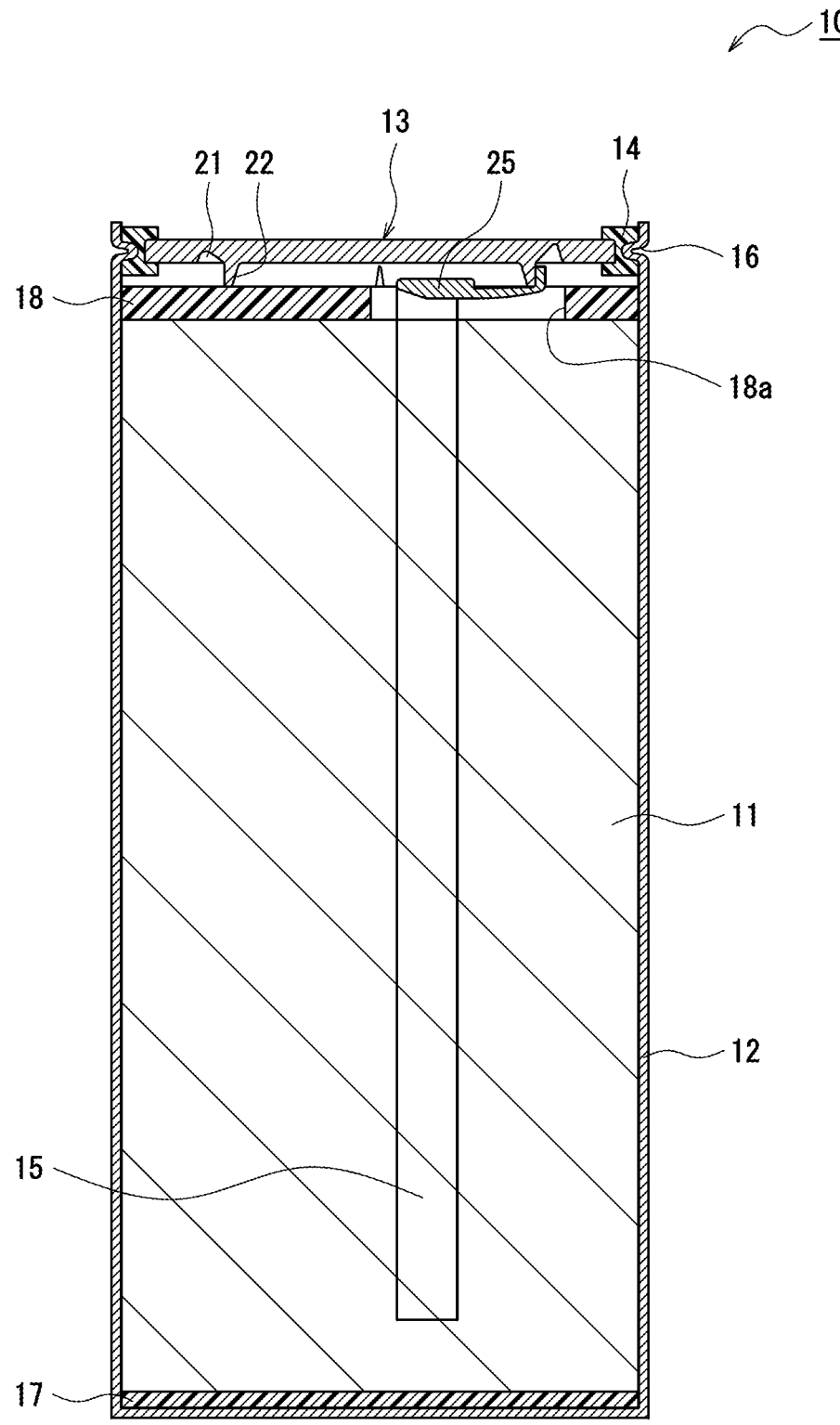
FIG. 1 is a cross-sectional view of a sealed battery according to an example embodiment.

FIG. 1 is a cross-sectional view of a cylindrical battery 10 according to an example embodiment. As shown as an example in FIG. 1, the cylindrical battery 10 is a cylindrical sealed battery comprising an electrode assembly 11 having an electrode tab connected thereto, a bottomed tubular exterior housing can 12 that houses the electrode assembly 11, and a sealing assembly 13 that closes an opening of the exterior housing can 12. In the present embodiment, a grooved portion 16 projecting toward the inside of the exterior housing can 12 is formed at the upper end portion of the exterior housing can 12, and the sealing assembly 13 is crimped and fixed to the upper end portion of the exterior housing can 12 via an insulating gasket 14. The exterior housing can 12 and the sealing assembly 13 are both made of metal and are insulated from each other by the gasket 14.

The electrode assembly 11 has a spiral structure in which a positive electrode and a negative electrode are spirally wound via a separator. The positive electrode, the negative electrode, and the separator are all ship-shaped elongate members. A positive electrode tab 15 is connected by welding or the like to the positive electrode, and a negative electrode tab (not shown) is connected by welding or the like to the negative electrode. In the present embodiment, the positive electrode tab 15, which has a strip shape and which is connected to a central portion, in the lengthwise direction, of the positive electrode, extends from the upper end of the electrode assembly 11 and is connected to the sealing assembly 13. The negative electrode tab is, for example, connected to at least one of a firstly-wound end portion or a lastly-wound end portion of the negative electrode, and connected to the inner face of the bottom portion of the exterior housing can 12. In this case, the sealing assembly 13 serves as the positive electrode external terminal, and the exterior housing can 12 serves as the negative electrode external terminal. It is alternatively possible to connect the negative electrode tab to the sealing assembly 13 and connect the positive electrode tab 15 to the exterior housing can 12.

The positive electrode comprises a positive electrode core and a positive electrode mixture layer formed on a surface of the positive electrode core. As the positive electrode core, it is possible to use a foil of a metal stable in the potential range of the positive electrode such as aluminum or an aluminum alloy, a film having such a metal disposed on its surface layer, or the like. The positive electrode mixture layer contains a positive electrode active material, a conductive agent such as acetylene black, and a binder such as polyvinylidene fluoride (PVdF), and is preferably formed on both sides of the positive electrode core in portions other than the portion to which the positive electrode tab 15 is connected. As the positive electrode active material, for example, a lithium transition metal composite oxide is used.

The negative electrode comprises a negative electrode core and a negative electrode mixture layer formed on a surface of the negative electrode core. As the negative electrode core, it is possible to use a foil of a metal stable in the potential range of the negative electrode such as copper or a copper alloy, a film having such a metal disposed on its surface layer, or the like. The negative electrode mixture layer contains a negative electrode active material and a binder such as styrene-butadiene rubber (SBR), and is preferably formed on both sides of the negative electrode core in portions other than the portion to which the negative electrode tab is connected. As the negative electrode active material, for example, a carbon-based active material such as graphite, a Si-based active material containing Si, or the like is used. It is alternatively possible to use a current-collecting structure in which no negative electrode tab is connected to the negative electrode and a surface of the negative electrode core is brought into contact with the inner circumferential surface of the exterior housing can 12.

An insulating plate 17 is placed between the inner face of the bottom portion of the exterior housing can 12 and the electrode assembly 11 so as to prevent electrical contact between the positive electrode in the electrode assembly 11 and the exterior housing can 12. For example, the negative electrode tab extends toward the bottom portion of the exterior housing can 12 through a gap between the exterior housing can 12 and the insulating plate 17. Further, an insulating spacer 18 is placed between the sealing assembly 13 and the electrode assembly 11. The spacer 18 prevents electrical contact between the negative electrode in the electrode assembly 11 and the sealing assembly 13, and also adjusts the spacing between the electrode assembly 11 and the sealing assembly 13. As described in detail further below, the positive electrode tab 15 is preferably in a taut state without slack so that the current path can be easily cut off when an abnormality occurs. The positive electrode tab 15 extends toward the sealing assembly 13 through a through hole 18$a$ in the spacer 18.

The exterior housing can 12 houses the electrode assembly 11 and an electrolyte. The electrolyte may be an aqueous electrolyte, but is preferably a non-aqueous electrolyte. The non-aqueous electrolyte contains, for example, a non-aqueous solvent and an electrolyte salt dissolved in the non-aqueous solvent. As the non-aqueous solvent, an ester, an ether, a nitrile, an amide, a mixed solvent of two or more of the foregoing, or the like is used. The non-aqueous solvent may contain a halogen-substituted product obtained by substituting at least a part of hydrogens in the above solvents with a halogen atom such as fluorine. The non-aqueous electrolyte is not limited to a liquid electrolyte, and may alternatively be a solid electrolyte. As the electrolyte salt, a lithium salt such as $LiPF_6$ is used.

Figure 2:
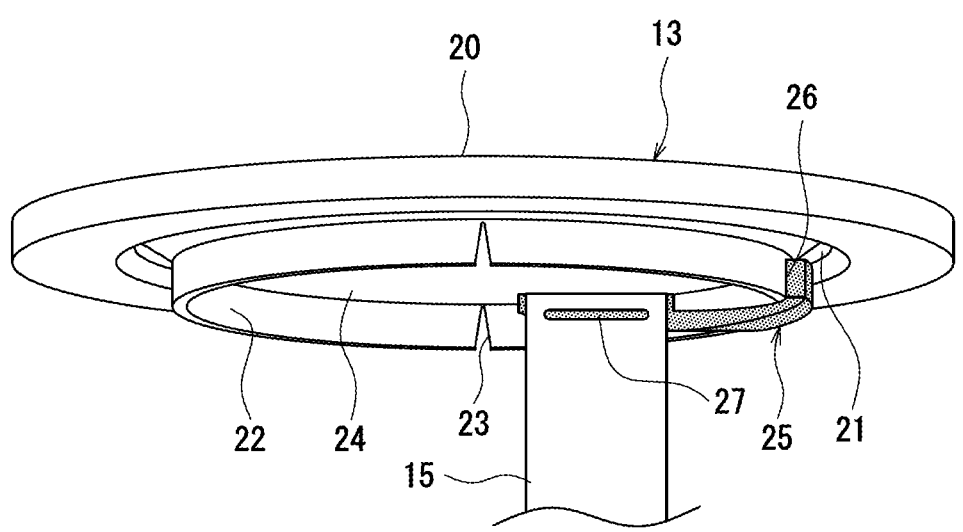
FIG. 2 is a perspective view of a sealing assembly, as viewed from an inner face side, according to the example embodiment.

The configuration of the sealing assembly 13 and the connection structure between the sealing assembly 13 and the positive electrode tab 15 will now be described in detail by reference to FIGS. 2 to 4. FIG. 2 is a perspective view of the sealing assembly 13 as viewed from the inner face side, FIG. 3 is a bottom view of the sealing assembly 13, and FIG. 4 is a cross-sectional view taken along line A-A in FIG. 3.

Figure 3:
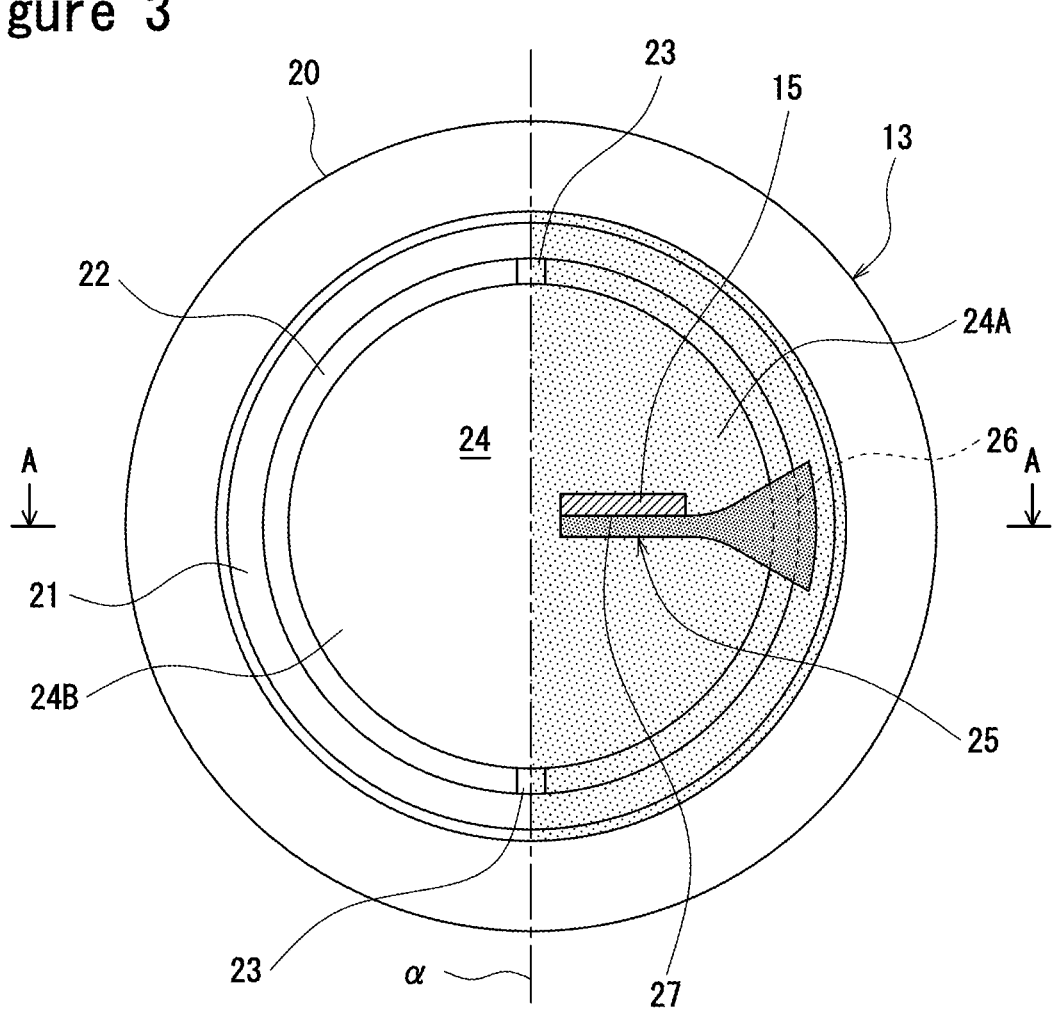
FIG. 3 is a bottom view of the sealing assembly according to the example embodiment.
Figure 4:
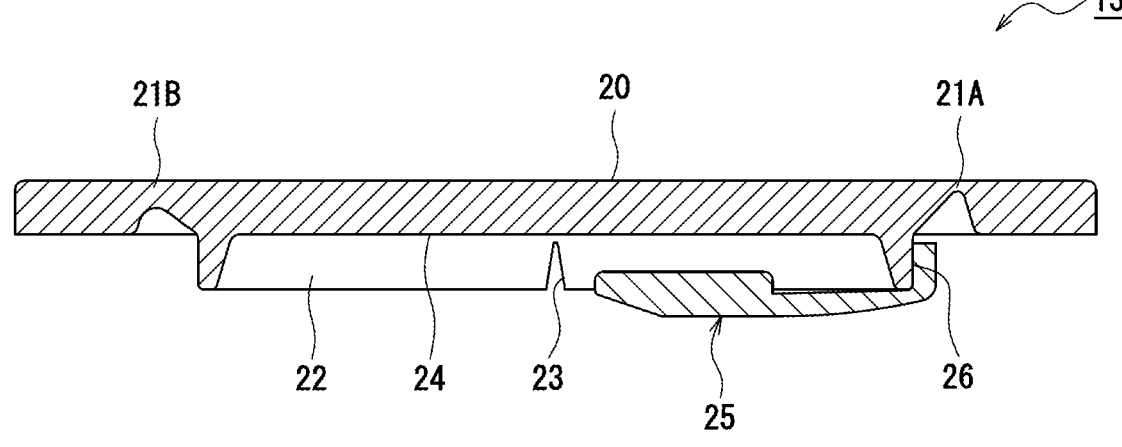
FIG. 4 is a cross-sectional view taken along line A-A in FIG. 3.

As shown as an example in FIGS. 2 to 4, the sealing assembly 13 comprises a rupture plate 20 including a valve part 24, a projecting portion 22 projecting from the inner face of the valve part 24 toward the electrode assembly 11, and a connecting member 25 joined to the projecting portion 22. The inner face of the rupture plate 20 (or the valve part 24) means a face facing the electrode assembly 11. The rupture plate 20 is composed of a single metal plate having formed therein a thin portion 21 that ruptures when the internal pressure of the battery reaches a predetermined pressure. An example of a suitable metal plate is an aluminum plate or an aluminum alloy plate containing aluminum as the main component.

The rupture plate 20 has a shape and dimensions capable of closing the opening of the exterior housing can 12. The rupture plate 20 is, for example, a disk having a perfectly circular shape in bottom view. In the present embodiment, an annular groove is formed in the inner face of the rupture plate 20. The portion where this groove is formed is thinner than the other portions, and serves as the thin portion 21 which ruptures first when the internal pressure of the battery increases. The thin portion 21 has a diameter smaller than the diameter of the rupture plate 20, and is formed in a circular shape (or a perfectly circular shape in bottom view) concentric with the peripheral circular portion of the rupture plate 20. The thin portion 21 is not necessarily formed in a perfectly circular shape, but is preferably formed in an annular shape.

The thickness of the rupture plate 20 is not particularly limited, but as an example, the thickness of portions other than the thin portion 21 and the projecting portion 22 is 0.3 mm to 2 mm. The thickness of the thin portion 21 is, for example, 10% to 50% of the thickness of the valve part 24. The thin portion 21 may be formed with the same thickness over its entire length, but in the present embodiment, a first thin portion 21A and a second thin portion 21B, each formed in an arc shape, are connected to form one annular shape. While both the first thin portion 21A and the second thin portion 21B are formed by grooves having a substantially V-shaped cross section, the remaining thickness of the first thin portion 21A is less than the remaining thickness of the second thin portion 21B.

The portion of the rupture plate 20 surrounded by the thin portion 21 is the valve part 24 that opens toward the outside of the battery as a result of rupture of the thin portion 21. The valve part 24 opens when the internal pressure of the battery reaches a predetermined operating pressure (i.e., the pressure at which the thin portion 21 ruptures) due to an abnormality in the battery, and discharges gas inside the battery to prevent the exterior housing can 12 from bursting. In the present embodiment, the valve part 24, which has a perfectly circular shape in bottom view, is formed in the rupture plate 20 in a portion other than the peripheral portion. The valve part 24 includes two valve parts (i.e., a first valve part 24A and a second valve part 24B). The thin portion 21 preferably has a shape of a curved line that extends continuously over the entire range, but a part of the thin portion 21 may be discontinuous to the extent that the operation of the valve part 24 is not hindered. While the first valve part 24A and the second valve part 24B shown in FIG. 3 have the same area in bottom view, the two valve parts may alternatively have different areas.

The first valve part 24A is a part surrounded by the first thin portion 21A and a straight line a connecting between both ends thereof, and is formed in a semicircular shape in bottom view. Similarly, the second valve part 24B is a part surrounded by the arc of the second thin portion 21B and the straight line a connecting between both ends thereof, and is formed in a semicircular shape in bottom view. The first thin portion 21A and the second thin portion 21B are sufficient so long as they are formed in a shape of a curved line in bottom view. The first thin portion 21A and the second thin portion 21B preferably have a shape of a curved line convex to the peripheral portion of the rupture plate 20, and more preferably have a shape of an arc.

Figure 5:
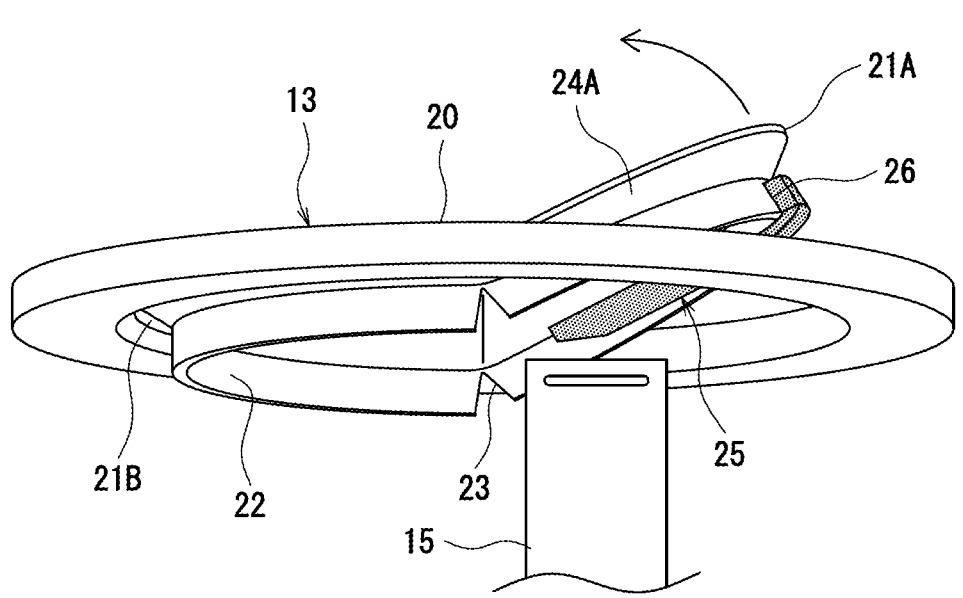
FIG. 5 is a diagram showing the sealing assembly, with its valve part in an open state, according to the example embodiment.

Since the remaining thickness of the first thin portion 21A is less than the remaining thickness of the second thin portion 21B, the first valve part 24A ruptures first before the second valve part 24B when the internal pressure of the battery reaches a predetermined pressure. At that time, as shown in FIG. 5, the first valve part 24A opens outward with the straight line a serving as the rotation axis. As will be described in detail further below, by the opening of the first valve part 24A, gas is discharged, and the connection between the sealing assembly 13, which also functions as the positive electrode external terminal, and the positive electrode tab 15 is disconnected, so that the current path in the battery is cut off. In order to facilitate rotation of the first valve part 24A, a crease line or a shallow groove may be formed along the straight line a. The valve part 24 can be composed of only the first valve part 24A, but by combining the first valve part 24A with the second valve part 24B, the gas discharge performance of the valve part 24 can be enhanced. Therefore, the valve part 24 preferably includes the second valve part 24B together with the first valve part 24A.

As described above, the projecting portion 22 is a protrusion formed on the inner face of the valve part 24, and is formed in an annular shape along the peripheral edge portion of the valve part 24. The projecting portion 22 is a portion to which the connecting member 25 is fixed, and is formed with a projecting length that allows the connecting member 25 to be fixed by welding or the like and that does not interfere with the electrode assembly 11. The projecting portion 22 has, for example, a side face extending along the vertical direction, and on this side face, a first joint area 26 joined to the connecting member 25 is formed.

In the present specification, a side face of each of the projecting portion 22 and the connecting member 25 means a face facing in a direction intersecting the face direction of the rupture plate 20, and may be, for example, a face that is inclined at an angle of 45° or less with respect to the vertical direction perpendicular to the face direction of the rupture plate 20.

In the projecting portion 22, at positions overlapping the straight line a which is the rotation axis of the first valve part 24A and which serves as the boundary between the first valve part 24A and the second valve part 24B, two slits 23 arranged serially in the radial direction of the rupture plate 20 are formed. These two slits 23 separate the projecting portion 22 into a first portion formed on the first valve part 24A and a second portion formed on the second valve part 24B. With this arrangement, the first valve part 24A is configured to easily open in a manner rotating with the straight line a serving as the rotation axis.

The connecting member 25 is a conductive member that electrically connects between the positive electrode tab 15 and the valve part 24, and is such that a side face of one end portion thereof is joined to a side face of the projecting portion 22, while a side face of the other end portion thereof is joined to the positive electrode tab 15. At least a part of at least one of a first joint area 26 between the projecting portion 22 and the connecting member 25 or a second joint area 27 between the positive electrode tab 15 and the connecting member 25 is located in a plane intersecting the straight line a. With this arrangement, when the first thin portion 21A opens in a manner rotating with the straight line a serving as the rotation axis, a rotational shear force acts on at least one of the first joint area 26 or the second joint area 27. The first joint area 26 and the second joint area 27 are formed by, for example, laser welding.

In the present embodiment, the one end portion of the connecting member 25 is joined, at a position farthest from the straight line a that serves as the rotation axis, to the first portion of the projecting portion 22 formed on the first valve part 24A. The one end portion of the connecting member 25 has a shape curved along the side face of the projecting portion 22 formed in an annular shape, and the first joint area 26 is formed along the side face of the projecting portion 22. A central portion of the first joint area 26 in the circumferential direction of the projecting portion 22 is located in a plane that does not intersect the rotation axis of the first valve part 24A (i.e., the straight line a). For this reason, when the first valve part 24A opens, no rotational shear force acts on the central portion of the first joint area 26, although a vertical shear force acts thereon.

On the other hand, both end portions of the first joint area 26 in the circumferential direction of the projecting portion 22 are located in planes intersecting the rotation axis of the first valve part 24A. For this reason, when the first valve part 24A opens, a rotational shear force acts on joint regions of the both end portions of the first joint area 26. That is, when at least a part of the first joint area 26 is located in a plane intersecting the rotation axis of the first valve part 24A, a rotational shear force acts thereon when the first valve part 24A opens.

The connecting member 25 has, in bottom view, a shape that gradually widens toward the one end portion joined to the side face of the projecting portion 22. The other end portion of the connecting member 25 is narrower than the one end portion, and extends along the radial direction of the rupture plate 20 (or the valve part 24), while the side face of the one end portion is joined along the side face of the projecting portion 22. The connecting member 25 extends from the vicinity of the first thin portion 21A of the first valve part 24A to the vicinity of the rotation axis of the first valve part 24A, and is joined to the sealing assembly 13 only at the first joint area 26.

The positive electrode tab 15 is joined to the side face of the other end portion of the connecting member 25. In the present embodiment, the entire second joint area 27 between the positive electrode tab 15 and the connecting member 25 is located in a plane substantially orthogonal to the rotation axis of the first valve part 24A. For this reason, a large rotational shear force acts on the second joint area 27 when the first valve part 24A opens. As with the first joint area 26, it is sufficient so long as at least a part of the second joint area 27 is located in a plane intersecting the rotation axis of the first valve part 24A. However, preferably, the entire second joint area 27 is located in a plane intersecting the rotation axis of the first valve part 24A, and more preferably, as in the present embodiment, the entire second joint area 27 is located in a plane orthogonal to the rotation axis of the first valve part 24A.

Further, while the first joint area 26 is formed in the vicinity of the first thin portion 21A, the second joint area 27 is formed closer to the rotation axis of the first valve part 24A than to the first thin portion 21A. For example, the second joint area 27 is formed along the radial direction of the valve part 24 to extend, with a uniform width, from a central portion of the first valve part 24A to the vicinity of the rotation axis of the first valve part 24A (see FIG. 2). In order to avoid interference with the second valve part 24B, the connecting member 25 has a length such that the other end portion thereof approaches the rotation axis of the first valve part 24A without extending beyond the rotation axis.

When the first valve part 24A opens as shown in FIG. 5, while a part of the first joint area 26 between the projecting portion 22 and the connecting member 25 is subjected to a rotational shear force, concerning the second joint area 27 located in a plane orthogonal to the rotation axis of the first valve part 24A, its entirety is subjected to a rotational shear force. Furthermore, when the first valve part 24A opens outward with the straight line a serving as the rotation axis, a second type of lever is formed in the cross-sectional view shown in FIG. 4, with the rotation axis serving as the fulcrum, the first thin portion 21A serving as the point of effort, and the second joint area 27 serving as the point of load, and a large force acts on the second joint area 27. Accordingly, the second joint area 27 can be broken more easily than the first joint area 26.

As such, according to the cylindrical battery 10 having the above-described configuration, while a simplified and low-cost structure is employed, the second joint area 27 is easily disengaged when the first valve part 24A opens upon occurrence of an abnormality in the battery, and the current path is more reliably cut off. For example, the second joint area 27 formed by laser welding with a width of approximately 0.5 mm and a length of approximately 2.5 mm has a weld strength of 30 N or more in the vertical direction, but its torque strength is about 20 N·mm. Therefore, when a stress in a direction that causes rotation in the second joint area 27 acts on a point 5 mm away from the joint area, the joint area is broken by a force of 4N. It is noted that in a conventionally typical sealed battery, a joint area joined to an electrode tab is formed on a bottom face of a sealing assembly along the face direction. In order to break such a joint area by applying a vertical tensile stress to the joint area, a force exceeding the weld strength of 30 N would be required.

Figure 6A:
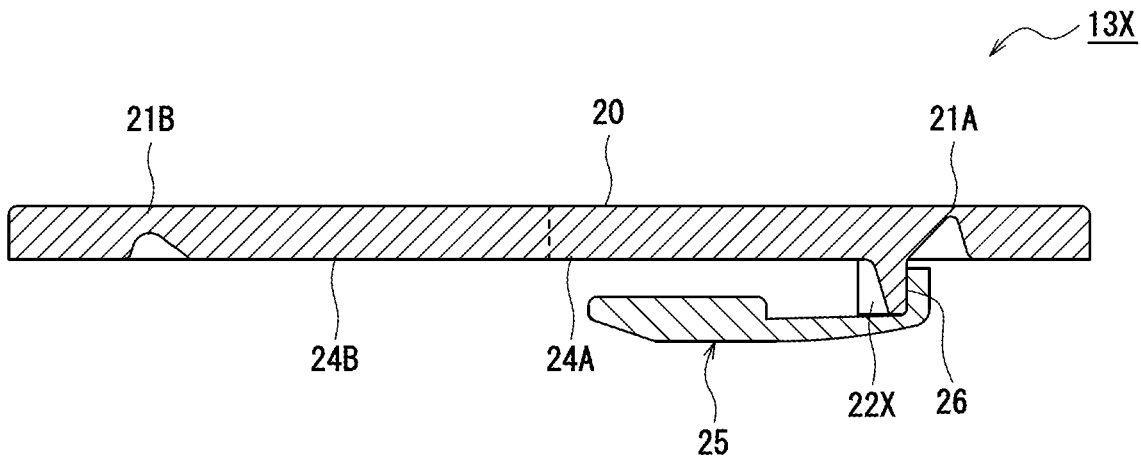
FIG. 6A is a cross-sectional view showing a variant of the sealing assembly.
Figure 6B:
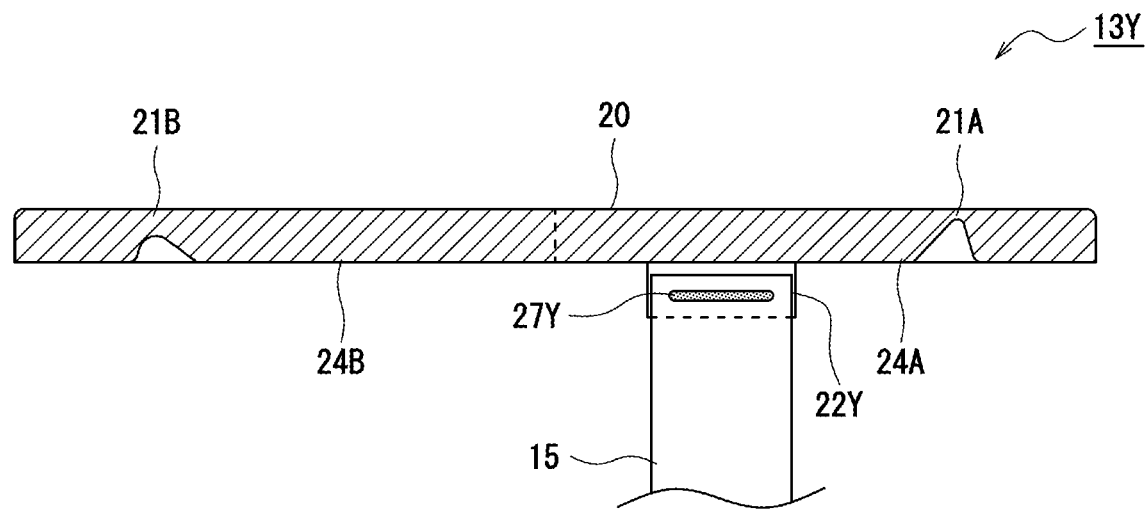
FIG. 6B is a cross-sectional view showing a variant of the sealing assembly.

FIGS. 6A and 6B are cross-sectional views showing variants of the sealing assembly 13 (i.e., sealing assemblies 13X, 13Y). While the above-described sealing assembly 13 has an annular projecting portion 22 formed on the inner face of the first valve part 24A and the second valve part 24B, the sealing assembly 13X shown in FIG. 6A has formed thereon a projecting portion 22X having, in bottom view, an arc shape extending over a width similar to that of the one end portion of the connecting member 25. The projecting portion 22X is formed only on the first valve part 24A, and is gently curved along the first thin portion 21A formed in an arc shape. The projecting portion 22X may alternatively be formed in a flat plate shape along the rotation axis of the first valve part 24A.

The sealing assembly 13Y shown in FIG. 6B is different from the sealing assembly 13 in that the connecting member is not included, and the positive electrode tab 15 is directly joined to a side face of a projecting portion 22Y. The side face of the projecting portion 22Y is formed flat and is located in a plane orthogonal to the rotation axis of the first valve part 24A. With this arrangement, when the first thin portion 21A ruptures and the first valve part 24A opens, a large rotational shear force acts on a joint area 27Y formed on the side face of the projecting portion 22Y and joined to the positive electrode tab 15.

Figure 7A:
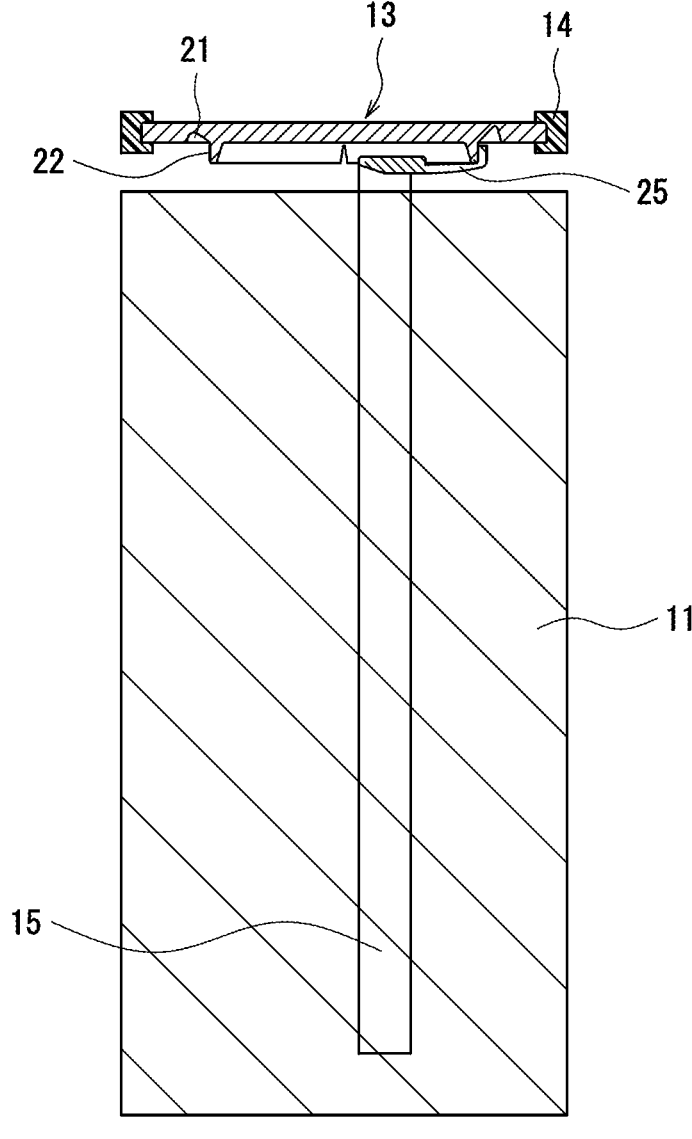
FIG. 7A is a diagram for explaining a manufacturing method of the sealed battery according to the example embodiment.
Figure 7B:
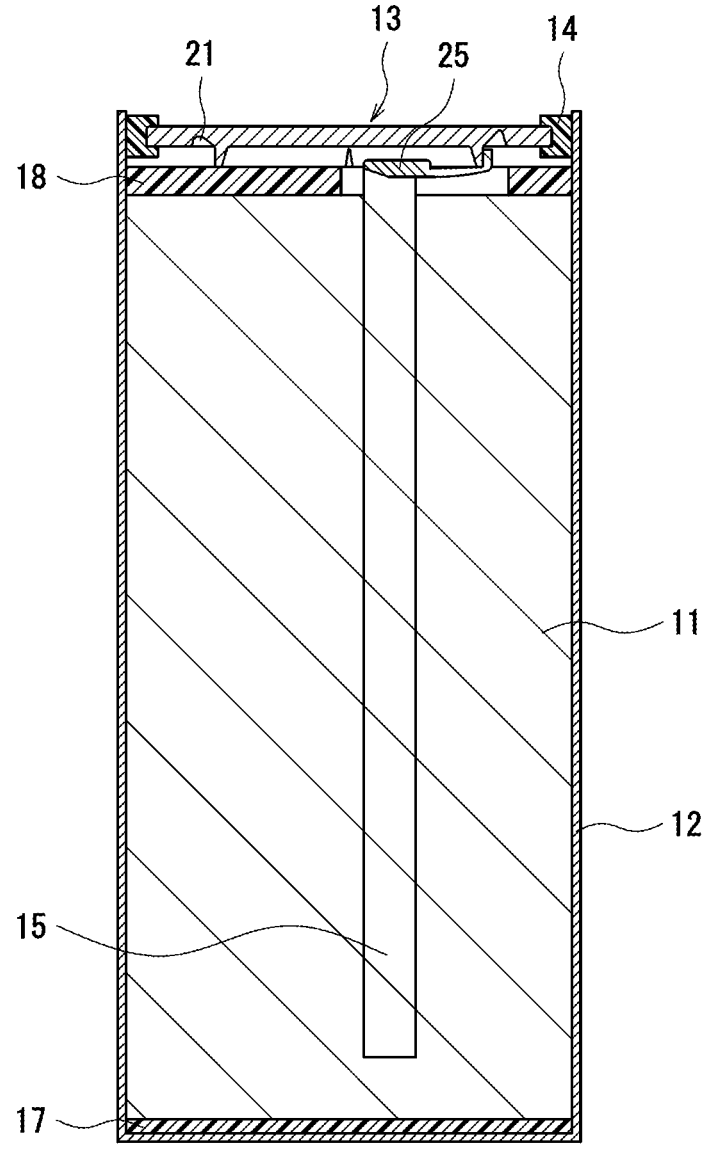
FIG. 7B is a diagram for explaining a manufacturing method of the sealed battery according to the example embodiment.

FIGS. 7A and 7B are diagrams showing a manufacturing process of the cylindrical battery 10. As shown in FIG. 7A, the manufacturing process of the cylindrical battery 10 includes a process of joining the positive electrode tab 15 connected to the electrode assembly 11 to the sealing assembly 13. The positive electrode tab 15 is joined to the side face of the other end portion of the connecting member 25 by laser welding or the like. The connecting member 25 is joined at the one end portion to the side face of the projecting portion 22 of the sealing assembly 13 by laser welding or the like. Further, to the peripheral edge portion of the rupture plate 20 of the sealing assembly 13, a ring-shaped gasket 14 is attached.

Next, as shown in FIG. 7B, with the spacer 18 inserted between the electrode assembly 11 and the sealing assembly 13, the electrode assembly 11 and the electrolyte are placed inside the exterior housing can 12, and the sealing assembly 13 is arranged on the inner side of the opening of the exterior housing can 12 in such a manner that the opening at the upper end of the exterior housing can 12 is closed with the sealing assembly 13. In this state, by crimping the exterior housing can 12 from the outer side in the radial direction of the sealing assembly 13, the opening of the exterior housing can 12 is closed by the sealing assembly 13 via the gasket 14, and the cylindrical battery 10 as shown in FIG. 1 is obtained. It is noted that an insulating plate 17 is placed between the electrode assembly 11 and the inner face of the bottom portion of the exterior housing can 12.

As mentioned above, the spacer 18 prevents electrical contact between the negative electrode in the electrode assembly 11 and the sealing assembly 13, and also adjusts the spacing between the electrode assembly 11 and the sealing assembly 13 so that the positive electrode tab 15 is taut without slack. When the positive electrode tab 15 is in a state without slack, the rotational shear force can easily acts on the second joint area 27 between the positive electrode tab 15 and the connecting member 25 without being absorbed by a slack portion.

REFERENCE SIGNS LIST

10 cylindrical battery; 11 electrode assembly; 12 exterior housing can; 13, 13X, 13Y sealing assembly; 14 gasket; 15 positive electrode tab; 16 grooved portion; 17 insulating plate; 18 spacer; 18a through hole; 20 rupture plate; 21 thin portion; 21A first thin portion; 21B second thin portion; 22, 22X, 22Y projecting portion; 23 slit; 24 valve part; 24A first valve part; 24B second valve part; 25 connecting member; 26 first joint area; 27 second joint area

The invention claimed is:

1. A sealed battery, comprising an electrode assembly having an electrode tab connected thereto, a bottomed tubular exterior housing can that houses the electrode assembly, and a sealing assembly that closes an opening of the exterior housing can, wherein the sealing assembly includes a rupture plate, the rupture plate has a first valve part surrounded by a first portion having a shape of a curved line and that ruptures when an internal pressure of the sealed battery reaches a predetermined operating pressure, and a straight-line portion connecting between both ends of the first portion, the first valve part has a projecting portion projecting toward the electrode assembly, and opens toward an outside of the sealed battery with the straight-line portion serving as a rotational axis when the internal pressure of the sealed battery reaches the operating pressure, the electrode tab is joined to a side face of the projecting portion facing a direction intersecting a face direction of the rupture plate, a plane including a joint area formed through joining of the electrode tab and the side face of the projecting portion intersects the straight-line portion, the rupture plate has an annular portion formed with the first portion and a second portion having a shape of a curved line connected to both ends of the first portion, and a remaining thickness of the first portion is less than a remaining thickness of the second portion.

2. The sealed battery according to claim 1, wherein the plane including the joint area is orthogonal to the straight-line portion.

3. The sealed battery according to claim 1, wherein the first portion has a shape of a curved line convex to a peripheral portion of the rupture plate.

4. A sealed battery, comprising an electrode assembly having an electrode tab connected thereto, a bottomed tubular exterior housing can that houses the electrode assembly, and a sealing assembly that closes an opening of the exterior housing can, wherein the sealing assembly includes a rupture plate, the rupture plate has a first valve part surrounded by an annular portion formed with a first portion having a shape of a curved line and a second portion having a shape of a curved line connected to both ends of the first portion, and a straight-line portion connecting between both ends of the first portion, a remaining thickness of the first portion is less than a remaining thickness of the second portion, the first valve part has a projecting portion projecting toward the electrode assembly, the electrode tab is joined to a side face of the projecting portion, and at least a part of a joint area between the electrode tab and the projecting portion is located in a plane intersecting the straight-line portion.

5. The sealed battery according to claim 4, wherein the plane including the joint area is orthogonal to the straight-line portion.

6. The sealed battery according to claim 4, wherein the first portion has a shape of a curved line convex to a peripheral portion of the rupture plate.

7. A sealed battery, comprising an electrode assembly having an electrode tab connected thereto, a bottomed tubular exterior housing can that houses the electrode assembly, and a sealing assembly that closes an opening of the exterior housing can, wherein the sealing assembly includes a rupture plate and a connecting member interposed between the rupture plate and the electrode tab, the rupture plate has a first valve part surrounded by an annular portion formed with a first portion having a shape of a curved line and a second portion having a shape of a curved line connected to both ends of the first portion, and a straight-line portion connecting between both ends of the first portion, a remaining thickness of the first portion is less than a remaining thickness of the second portion, the first valve part has a projecting portion projecting toward the electrode assembly, the connecting member is joined to a side face of the projecting portion, the electrode tab is joined to a side face of the connecting member, and at least a part of at least one of a first joint area between the projecting portion and the connecting member or a second joint area between the electrode tab and the connecting member is located in a plane intersecting the straight-line portion.

8. The sealed battery according to claim 7, wherein at least one of the plane including the first joint area or the plane including the second joint area is orthogonal to the straight-line portion.

9. The sealed battery according to claim 7, wherein the first portion has a shape of a curved line convex to a peripheral portion of the rupture plate.

* * * * *